United States Patent [19]
Ahola et al.

[11] 3,985,377
[45] Oct. 12, 1976

[54] SLIP JOINT CONNECTION FOR ENGINE EXHAUST SYSTEM

[75] Inventors: Jacob W. Ahola; Fred A. Rendfeld, both of Decatur, Ill.

[73] Assignee: Caterpillar Tractor Co., Peoria, Ill.

[22] Filed: June 12, 1975

[21] Appl. No.: 586,317

[52] U.S. Cl. .................................. 285/9 R; 60/322;
285/165; 285/334.5
[51] Int. Cl.² ................................................ F16L 27/02
[58] Field of Search ........... 285/9 R, 164, 165, 163, 285/268, 334.4, 9 M, 169; 60/322

[56] References Cited
UNITED STATES PATENTS

| | | | |
|---|---|---|---|
| 1,780,693 | 11/1930 | Yazel | 285/165 X |
| 2,242,604 | 5/1941 | Wells | 285/268 X |
| 2,295,907 | 9/1942 | Lewis | 285/164 |
| 2,517,470 | 8/1950 | Erisman | 285/9 R |
| 3,173,710 | 3/1965 | Kinnison | 285/9 R |
| 3,227,475 | 1/1966 | Sinkinson | 285/9 R |
| 3,298,680 | 1/1967 | Jablin | 285/9 R X |

*Primary Examiner*—Thomas F. Callaghan
*Attorney, Agent, or Firm*—Phillips, Moore, Weissenberger, Lempio & Strabala

[57] ABSTRACT

The invention is concerned with a slip joint connection between an exhaust manifold attached to an engine which is resiliently mounted to a vehicle frame and an exhaust outlet member which is rigidly mounted to the vehicle frame. The connection comprises an exhaust outlet sleeve rigidly mounted to said engine in flow communication with the manifold having a first peripherally extending portion. The connection further includes a hollow piston having a second peripherally extending portion adjacent a first end thereof and having a generally spherical external surface adjacent a second end thereof, the diameter of the spherical surface being substantially equal to the internal diameter of the sleeve, the second end of the piston being received in generally tight relation within the sleeve. Also a part of the connection is a conduit rigidly mounted in flow communication with the exhaust outlet member and having an inlet end adapted to abut in generally tight relation against the first end of the piston. Further, means are provided for biasing the second peripherally extending portion away from the first peripherally extending portion sufficiently to forcibly abut the first end of the piston and the inlet end of the conduit.

7 Claims, 10 Drawing Figures

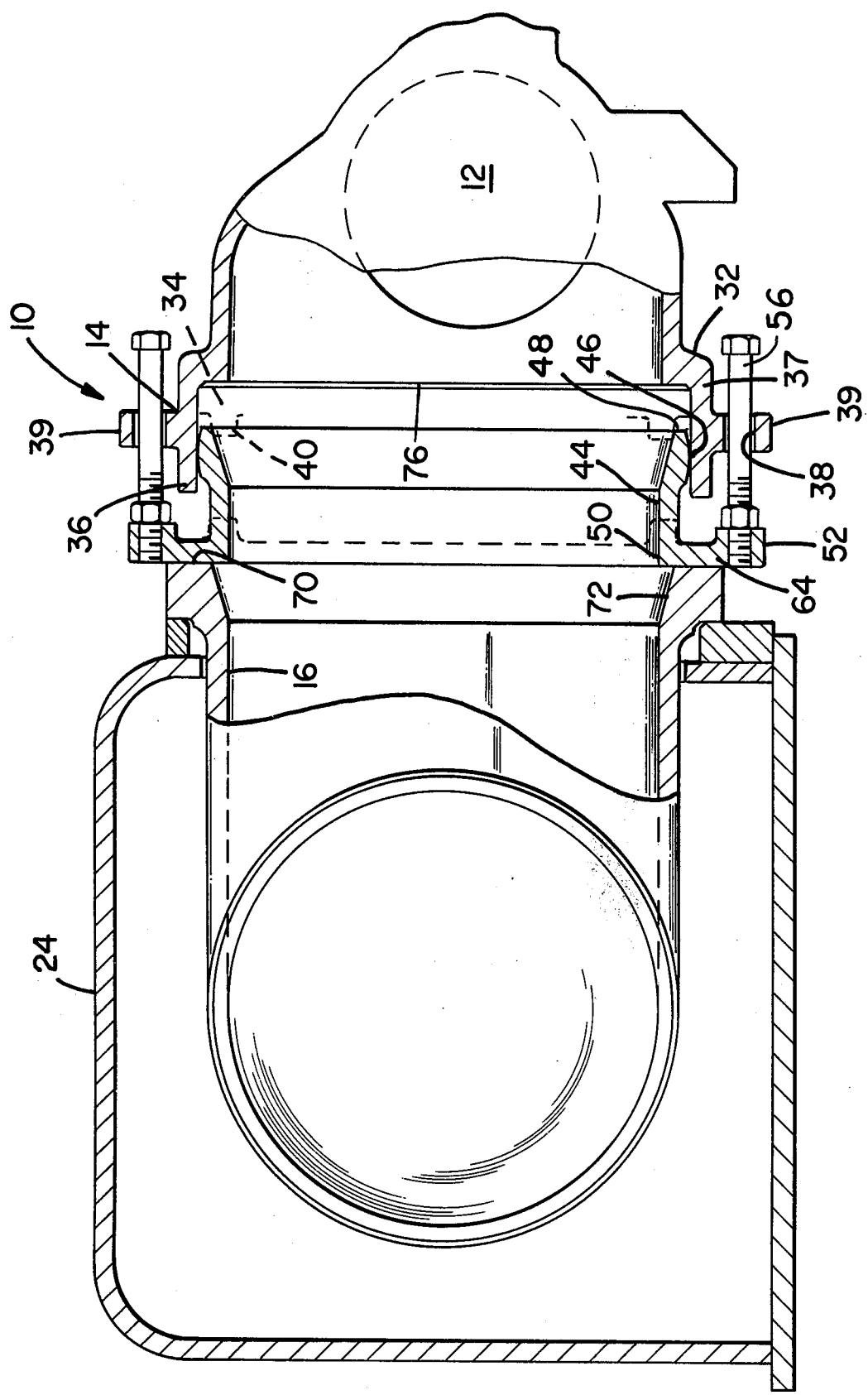
FIG_1

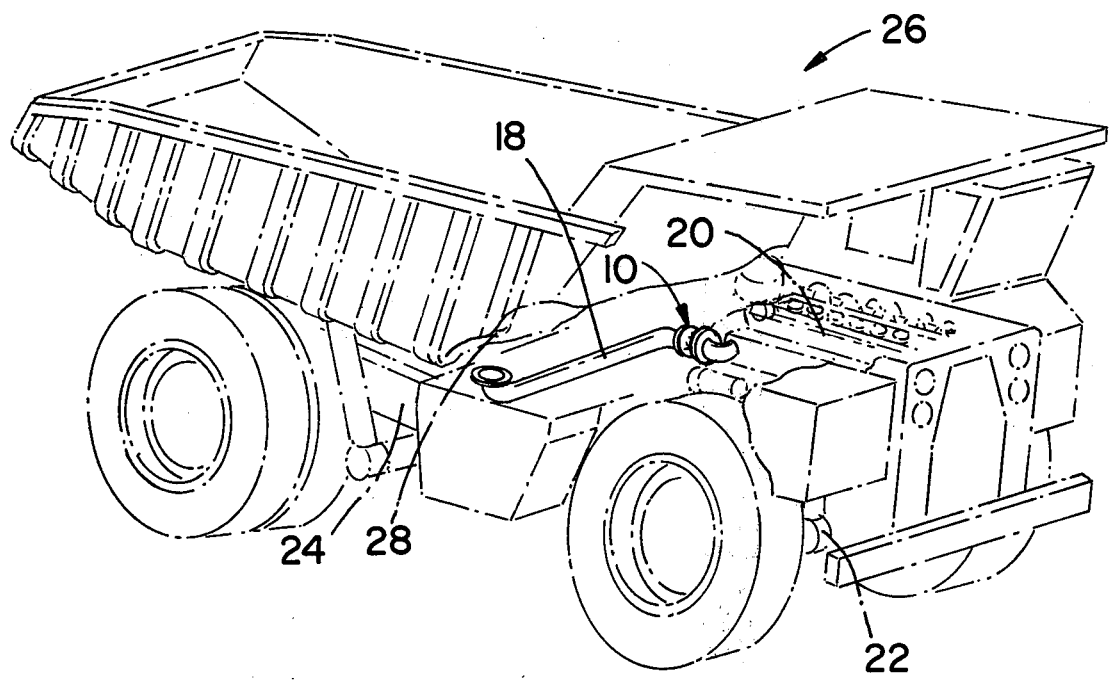

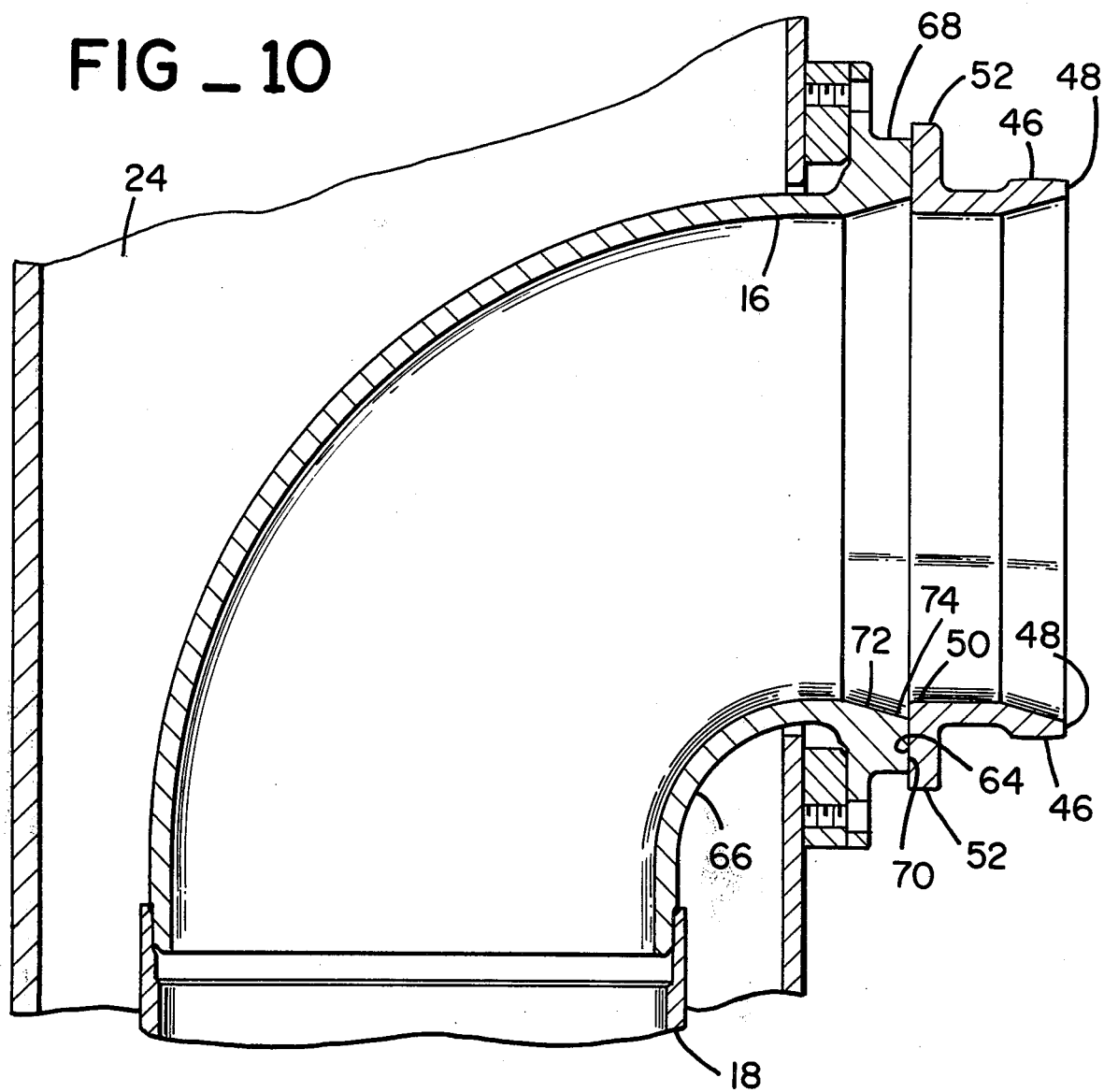
FIG_10
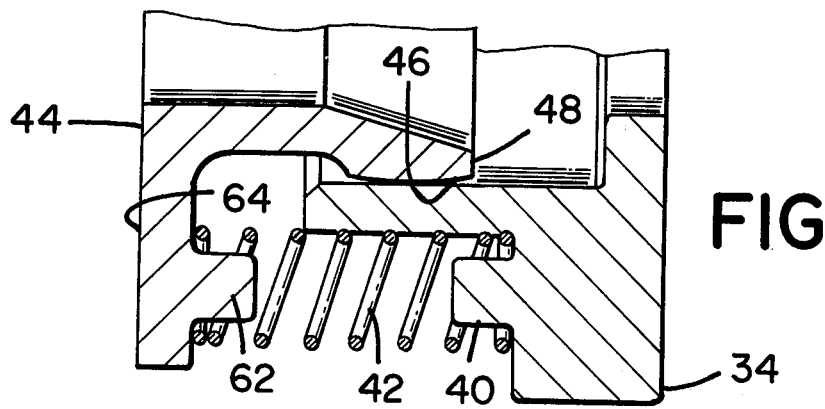
FIG_5

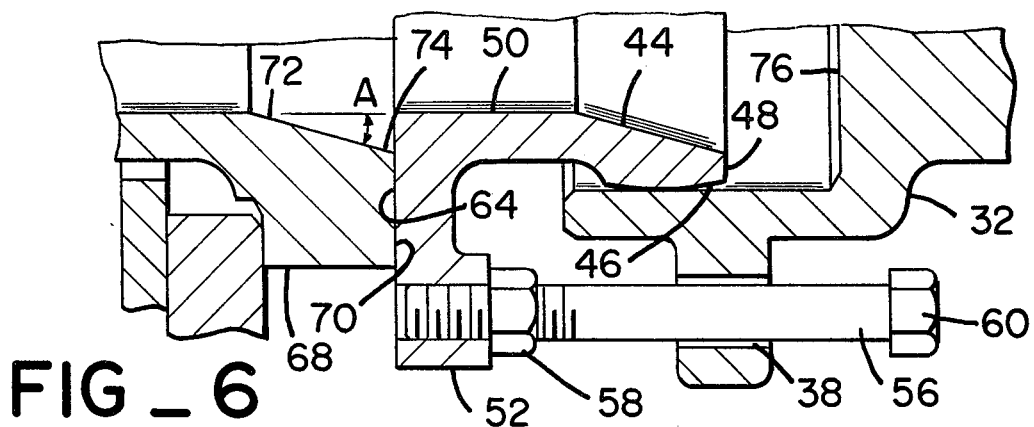
FIG_6
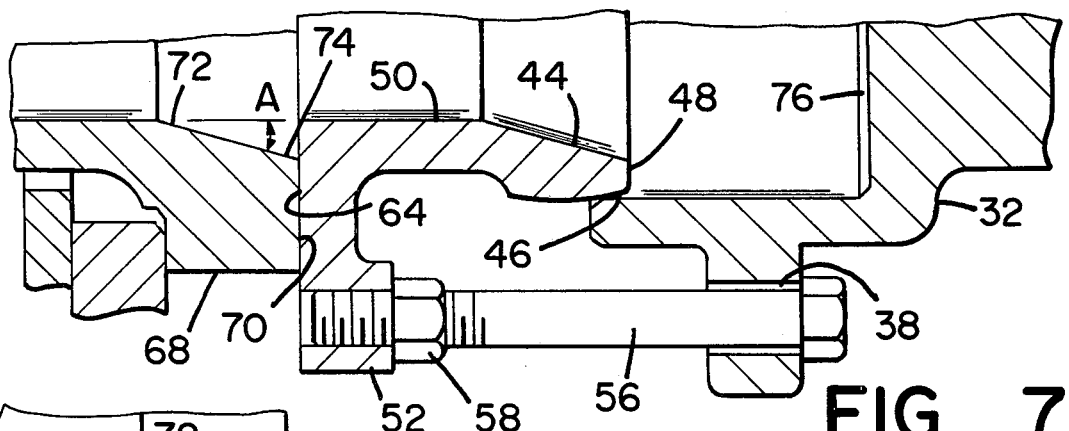
FIG_7
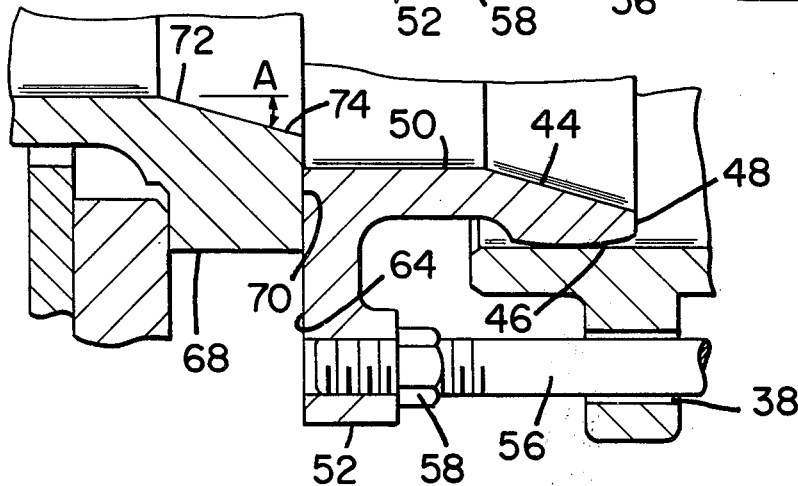
FIG_8
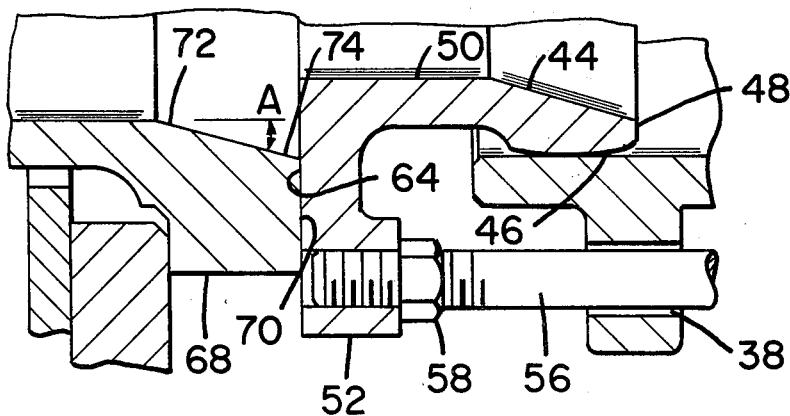
FIG_9

SLIP JOINT CONNECTION FOR ENGINE EXHAUST SYSTEM

BACKGROUND OF THE INVENTION

1. Field of the Invention

Exhaust systems for vehicles generally include an exhaust manifold which is attached to an engine. The engine is generally resiliently mounted to a vehicle frame. An exhaust system further generally includes an exhaust outlet member which is rigidly mounted to the vehicle frame. Since the manifold is resiliently mounted to the frame via the engine and the exhaust outlet member is rigidly mounted to the frame, the manifold and the outlet member, in use, often vibrate and otherwise move in an uncontrolled manner relative to one another. The present invention is concerned with an improved slip joint connection between the manifold and the outlet member which assures full flow connection without significant leakage despite the relative vibrations and other movements of the manifold and the exhaust outlet member.

2. Prior Art

A particularly severe problem is present in off-highway trucks and the like, wherein the exhaust of the engine of the truck is directed from the engine manifold into channels in the truck frame because of the severe jolting and shaking to which off-highway trucks are subjected. The exhaust manifold of such a truck is in the usual manner supported by the engine which is itself resiliently held to the truck frame. The truck frame, or an exhaust outlet member which accepts the exhaust from the manifold and is attached to the truck frame, clearly does not move or vibrate in the same manner as does the manifold because of the resilient mounting of the latter. The connection of the manifold to the exhaust outlet member must thus be flexible but must still have long life. Further, the connection must be fully sealed throughout the vibrations and other movements of the truck. Still further, the connection is desirably such that the exhaust from the manifold is not in any way passed through a restriction even under maximum misalignment conditions so that back pressure on the engine is not produced. It is also highly desirable that the connection between the manifold and the exhaust outlet member be such that it provides compensation for any initial misalignment between the engine (and hence the manifold) and the truck frame (and hence the exhaust outlet member). Such initial misalignment is common due to manufacturing tolerances and variances in assembling the many parts of the engine and the frame. Easy assembly of the manifold - connection - exhaust outlet member is likewise highly desirable.

Similar problems arise in other apparatus which include a fluid flow source, such as an exhaust manifold, and a fluid exhaust member, such as an exhaust outlet member, and in which these are mounted in adjacent non-rigid relation to one another with at least one of said source and said member being subjected to limited vibratory and other motions relative to the other.

Flexible hose connections provide one prior art solution to the above stated problems. However, flexible hose connections tend to deteriorate with use. For example, if such connections are made of fully metallic members, metal fatigue tends to develop, and if such connections are made of rubber or plastic members, the heat of the exhaust gasses which are directed through them tend to more or less swiftly deteriorate them. Still further the installation of such flexible members generally requires a fairly large separation of the fluid flow source from the fluid exhaust member if the full advantage of their flexibility is to be realized, i.e. there must be enough of the flexible member between the fluid flow source and the fluid exhaust member so that it can adequately flex, and this is not always possible in close fitting situations.

SUMMARY OF THE INVENTION

Broadly, the invention is a slip joint connection between a fluid flow source and a fluid exhaust member which are mounted in adjacent non-rigid relation to one another, at least one of said source and said member being subjected to limited vibratory and other motions relative to the other. The connection comprises an outlet sleeve in flow communication with the fluid flow source and rigidly mounted thereto. The outlet sleeve has a first peripherally extending portion. Also part of the connection is a hollow piston having a second peripherally extending portion adjacent a downstream end thereof and having a generally spherical external surface adjacent an upstream end thereof. The diameter of the spherical external surface adjacent the upstream end of the hollow piston is substantially equal to the internal diameter of the outlet sleeve and the upstream end of the piston is received in generally tight fit relation within the outlet sleeve. The connection further includes a conduit rigidly mounted to and in flow communication with the fluid exhaust member. The conduit has an outlet end adapted to abut in generally tight relation against the downstream end of the piston. Additionally, the connection comprises means for biasing the second peripherally extending portion which extends adjacent a downstream end of the hollow piston, away from the first peripherally extending portion which extends adjacent an exit end of the outlet sleeve sufficiently to forcibly abut the downstream end of the piston against the inlet end of the conduit.

BRIEF DESCRIPTION OF THE DRAWINGS

The invention will be better understood by reference to the figures of the drawings, wherein like numbers denote like parts throughout, and wherein:

FIG. 1 illustrates in section a slip joint of the present invention in side elevation;

FIG. 2 illustrates an off-highway truck utilizing the slip joint of FIG. 1;

FIG. 3 illustrates an alternate embodiment of an off-highway truck utilizing the slip joint of FIG. 1;

FIG. 5 illustrates a detail in the operation of the slip joint illustrated in FIGS. 1 and 4;

FIGS. 6–9 illustrate the slip operation of the slip joint illustrated in FIGS. 1 and 4; and FIG. 10 illustrates details in the slip joint illustrated in FIGS. 1 and 4.

DESCRIPTION OF THE PREFERRED EMBODIMENTS

Figure 4:
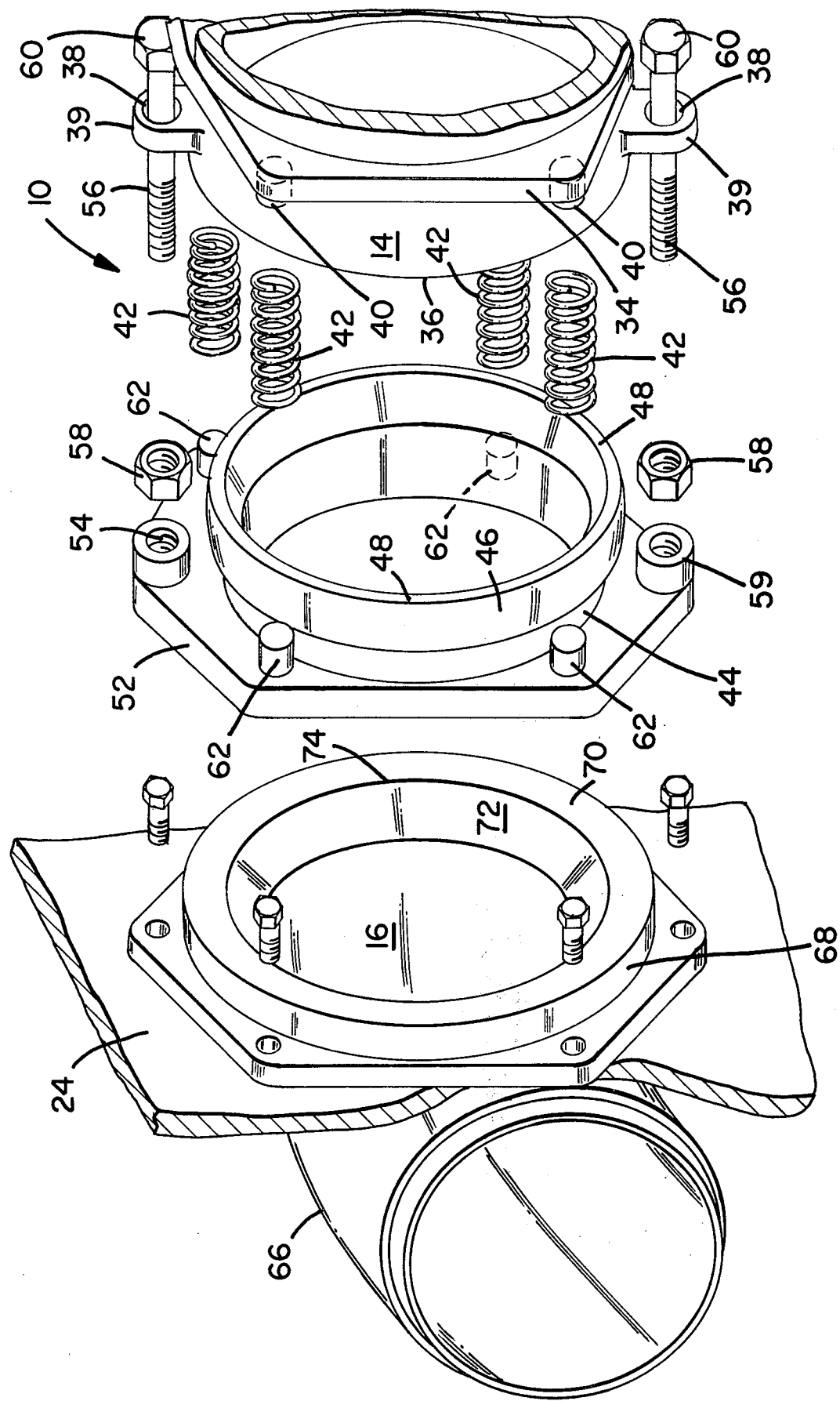
FIG. 4 illustrates in expanded perspective a slip joint of the present invention

A slip joint connection 10, as shown in FIG. 1, is provided between a fluid flow source, which in the preferred embodiments of the invention is an exhaust manifold 12, via a sleeve 14 and a conduit 16 to a fluid exhaust member, which in the preferred embodiments, comprises an exhaust outlet member 18.

The exhaust manifold 12 is attached to an engine 20 in a usual rigid manner. The engine 20 is attached resiliently as via the support members 22 to the frame 24 of a vehicle 26. The exhaust outlet member 18 can comprise a passage (or passages) 28 in the frame 24 as illustrated in FIG. 2, or can comprise an exhaust pipe 30 which is rigidly mounted to the frame 24 as illustrated in FIG. 3. It is clear that in either instance, the engine 20 is resiliently supported by the frame 24 while the exhaust outlet member 18 is rigidly mounted to the frame 24. During operation of the engine 20, vibrations and other motions are set up in the exhaust manifold 12 which are different than the vibrations which are set up in the frame 24. Further vibrations and other motions are caused as the vehicle 26 moves and road irregularities or off-road irregularities are translated differently to the resiliently mounted engine 20 exhaust manifold 12 than to the frame 24 and exhaust outlet member 18. This leads to an unpredictable motional relationship between the exhaust manifold 12 and the exhaust outlet member 18.

The sleeve 14 is in flow communication with the exhaust manifold 12 and is rigidly mounted thereto and is generally integral therewith. The sleeve 41 is generally of larger internal diameter and hence larger cross-sectional flow area than the smallest cross-sectional flow area of the manifold. This can be accomplished for example by having the sleeve 14 connected to the exhaust manifold 12 via a shoulder 32. In this manner, and as will become apparent from the following description, it is provided that the cross-sectional flow area throughout the connection 10 is never any less than the smallest cross-sectional flow area of the exhaust manifold 12. A first peripherally extending portion, generally a first flange 34 illustrated most clearly in FIG. 4, extends outwardly from the exterior of the sleeve 14. The first flange 34 is generally adjacent an exit end 36 of the sleeve 14 but is generally not at said exit end 36. In the preferred embodiment shown, the first flange 34 of the sleeve 14 is provided intermediate the exit end 36 of said sleeve 14 and the shoulder 32 which communicates with the entrance end 37 of the sleeve 14. In the preferred embodiment a pair of bolt holes 38 extend through a pair of ears 39 intermediate the flange 34 and the exit end 36 of the sleeve 14. The bolt holes 38 are generally unthreaded for reasons which later become apparent. The bolt holes 38 are generally equally spaced about the sleeve 14. Also, generally spaced about the first flange 34 and hence about the sleeve 14 are a plurality of nubs 40 which extend from said first flange 34 away from said shoulder 32. These nubs serve to hold one end each of a plurality of springs 42, the use of which will later become apparent.

A hollow piston 44 forms an essential part of the invention. The hollow piston 44 has a generally spherical external surface 46 adjacent an upstream end 48 thereof. The diameter of the spherical surface 46 is substantially equal to the internal diameter of the sleeve 14. The upstream end 48 of the hollow piston 44 is received in generally tight fit but linearly slidable relation within the sleeve 14. Adjacent a downstream end 50 of the hollow piston 44 is a second peripherally extending portion, in the preferred embodiment a second flange 52 which proceeds generally outwardly from the hollow piston 44. The second flange 52 includes a plurality, usually a pair, of generally equally spaced threaded holes 54 in one to one relation and in alignment with the bolt holes 38 of the ears 39. A plurality of bolts 56 with a corresponding plurality of lock nuts 58 are adapted to slidingly fit through the bolt holes 38 and then engagingly thread into the threaded holes 54 in the posts 59. The lock nuts 58 are used to adjust the distance between the bolt heads 60 and said lock nuts 58. A second plurality of nubs 62 are upraised from the second flange 52 in alignment with and in one to one relation with the first plurality of nubs 40. The second plurality of nubs 62 serve to hold the other ends of the springs 42. The downstream end 50 of the hollow piston 44 ends in a first flat annular surface 64 for reasons what will become apparent in following. The internal diameter of the hollow piston 44 is such that the cross-sectional flow area therethrough is at least as great as the smallest cross-sectional flow area of the manifold. The extension of the diameter of the sleeve 14 through use of the shoulder 32 makes this possible even though the hollow piston 44 fits within said sleeve 14.

The conduit 16 in the preferred embodiment of the invention extends to form an elbow 66 which is rigidly mounted to the frame 24 in flow communication to the exhaust outlet member 18. The conduit 16 has an inlet end 68 which is adapted to abut in generally tight fit relation against the downstream end 50 of the hollow piston 44. In the preferred embodiment this is accomplished by making the conduit 16 end in a second flat annular surface 70, which abuts the first flat annular surface 64 of the hollow piston 44. The cross-sectional flow area of the conduit 16 is generally at least as large as that of the hollow piston 44 and thus is also at least about as large as the smallest cross-sectional flow area of the manifold 12. In the preferred embodiment of the invention, the inlet end 68 of the conduit 16 is internally beveled to form a tapered throat 72 with a larger end 74 at the inlet end 68 of the conduit 16. The larger end 74 of the throat 72 has a cross-sectional flow area greater than the cross-sectional flow area of the conduit 16 as illustrated.

Means are provided as illustrated in FIGS. 1, 4 and 5 for biasing the second flange 52 away from the first flange 34 sufficiently to forcibly abut the downstream end 50 of the hollow portion 44 against the inlet end 68 of the conduit 16. More particularly, the first flat annular surface 64 of the hollow piston 44 is biased against the second flat annular surface 70 of the conduit 16. The preferred biasing means has been previously described and comprises the plurality of springs 42 held between the nubs 40 on the first flange 34 and the nubs 62 on the second flange 52, said nubs 40 and nubs 62 serving to hold the springs 42 from falling out from between the flanges 34 and 52.

The connection 10 preferably includes, as illustrated in FIGS. 1, 4 and 6–9, means for preventing the second flange 52 from being forced away from the first flange 34 sufficiently to remove the downstream end 50 of the piston 44 from the interior of the sleeve 14 and at the same time prevent relative rotation of the first flange 34 and the second flange 52. The preventing means in the preferred embodiments of the invention comprises the bolts 56 which slidably pass through the bolt holes 38 and are then threaded into the threaded holes 54 and held in place by the lock nuts 58. The distance between the lock nuts 58 and the bolt heads 60 is adjusted so that the upstream end 48 of the hollow piston 44 cannot slide out of the exit end 36 of the sleeve 14.

Because of the spherical external surface 46 of the upstream end 48 of the hollow piston 44, some small rotation of the exhaust manifold 12 with respect to the conduit 16 and the exhaust outlet member 18 can be tolerated while a tight fit is maintained between the spherical external surface 46 and the interior of the sleeve 14. Because of the biasing of the first flange 34 away from the second flange 52, inward and outward motion of the hollow piston 44 within the sleeve 14 can further be tolerated. Reference to FIG. 5 will show the inward and outward motion of the hollow piston 44 within the sleeve 14. Further, since the second flange 52 is biased away from the first flange 34, the first flat annular surface 64 is forcibly abutted against the second flat annular surface 70 throughout motion which may be imparted to the hollow piston 44 which causes it to move into and towards the exit end 36 of the sleeve 14. Also, location of the second flange 52 adjacent or yet better at the downstream end 50 of the hollow piston 44 is desirable since the springs 42 then act substantially directly to force the first flat annular surface 64 against the second flat annular surface 70. Yet further, the fact that the larger end 74 of the throat 72 occurs at the inlet end 68 of the conduit 16, assures that the cross-sectional flow area from the hollow piston 44 into the conduit 16 is not restricted even if the conduit 16 and the hollow piston 44 are slid relative to one another out of exact alignment. Generally, it is preferred that the angle, A, of beveling of the throat 72 be at least about 10° and more preferably be about 15° from the internal surface of the conduit 16 to assure correction for play between the hollow piston 44 and the conduit 16 caused by one or both of the exhaust manifold and the exhaust outlet member 18 vibrating or otherwise moving relative to one another. The separation between the exit end 36 of the sleeve 14 and the second flange 52 and the separation between the upstream end 48 of the hollow piston 44 and air inside part 76 of the shoulder 32 is made large enough to be of adequate travel for the piston 44 within the sleeve 14. Assembly of the slip joint connection 10 between the exhaust manifold 12 and the exhaust outlet member 18 is especially simple. The piston 44 is simply held, as by clamping or the like, as far as possible into the sleeve 14, e.g., up against the inside part 76 of the shoulder 32. The engine 20 is then dropped in place and the piston 44 is unclamped and the first flat annular surface 64 and the second flat annular surface 70 are impelled into abutting relationship.

In the preferred embodiment of the invention shown in FIG. 2, elbow 66 directs the exhaust into the truck frame 24 and thence through the channels 28 internal of truck body. The hot exhaust gasses serve to heat the truck body and release sticky material as they pass through the truck frame to an eventual exit generally located towards the rear of said frame.

In the embodiment illustrated in FIG. 3, the elbow 66 communicates with a muffler and an exhaust stack or pipe 30 which is mounted in rigid relationship to the frame 24.

OPERATION

In operation, gasses from the manifold 12 pass therefrom into the sleeve 14 then through the hollow piston 44 and the conduit 16 and thence to the exhaust outlet member 18 which may be the channel 28 or the exhaust pipe 30 as the case may be. As the manifold 12 and the conduit 16 move relatively apart from one another, the springs 42 as shown most clearly in FIG. 5 cause the hollow piston 44 to be forced towards the conduit 16 whereby the first flat annular surface 64 and the second flat annular surface 70 are kept in contact despite this relative motion. The maximum distance of travel of the hollow piston 44 is determined by the length of the bolts 56 as illustrated most clearly in FIGS. 6–9 and by the positioning of the lock nuts 58 with relation to the heads 60 of the bolts 56. Any slight rocking motion between the manifold 12 and the conduit 16 is accommodated by limited rotation of the sleeve 14 about the spherical external surfaces 46 at the upstream end 48 of the hollow piston 44. As the manifold 12 and the conduit 16 move sideways relative to one another as illustrated in FIGS. 6–9, such motion is compensated for by the sliding of the first flat annular surface 64 against the second flat annular surface 70 and the cross-sectional flow area through the throat 72 is not restricted because of the beveling thereof whereby the larger end 74 thereof faces the downstream end 50 of the hollow piston 44. The bolts 56 serve to keep the hollow piston 44 from being shoved fully out of the sleeve 14 and further serves to prevent relative rotation of the hollow piston 44 and the sleeve 14 about their common cylindrical axis. Because of the tight fit between the first flat annular surface 64 and the second flat annular surface 70 and between the spherical external surface 46 of the hollow piston 44 and the inside of the sleeve 14, and further because of the fact that the cross-sectional flow area remains substantially constant throughout the entire flow path, little or no escape of gas or other fluids can occur at the joinings of the hollow piston 44 with the conduit 16 and the sleeve 14 respectively.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In an exhaust system including an exhaust manifold attached to an engine which is resiliently mounted to a vehicle frame and an exhaust outlet member which is rigidly mounted to the vehicle frame, a slip joint connection between said manifold and said outlet member, comprising:
   an exhaust outlet sleeve rigidly mounted in flow communication with said manifold having a first peripherally outwardly extending portion and an internal cylindrical surface;
   only one internal hollow piston, said piston having a second peripherally outwardly extending portion adjacent a first end thereof and having a generally spherical external surface adjacent a second end thereof, the maximum diameter of said spherical surface being substantially equal to the internal cylindrical diameter of said sleeve, said second end of said piston being received in generally tight relation within said sleeve, said first end of said piston being in the form of a flat annular surface;

a conduit rigidly mounted in flow communication with said outlet member and having a flat annular inlet end adapted to abut radially and flatly in generally tight relation against said first end of said piston; and means for biasing said second peripherally extending portion away from said first peripherally extending portion sufficiently to forcibly abut said first end of said piston against said inlet end of said conduit.

2. A connection in an exhaust system as in claim 1, wherein said first peripherally extending portion comprises a first flange and said second peripherally extending portion comprises a second flange and including means for preventing said second flange from being forced away from said first flange sufficiently to remove said second end of said piston from the interior of said sleeve and relative rotation of said first and second flanges.

3. A connection in an exhaust system as in claim 2, wherein the cross-sectional flow area of said conduit is at least about as large as that of said piston and at least about as large as the smallest cross-sectional flow area of said manifold.

4. A connection in an exhaust system as in claim 3, wherein said inlet end of said conduit is internally beveled to form a tapered throat with its larger end at said inlet end of said conduit, said larger end having a cross-sectional flow area greater than the cross-sectional flow area of said conduit.

5. A connection in an exhaust system as in claim 4, wherein said biasing means comprises a plurality of springs generally equally spaced one from another.

6. A connection in an exhaust system as in claim 5, including a first plurality of nubs in one to one relation with said plurality of springs extending from said first flange towards said second flange and a second plurality of nubs in one to one relation with said plurality of springs extending from said second flange towards said first flange each of said second plurality of nubs being aligned with each of said first plurality of nubs, each of said springs fitting over one of said first plurality of nubs and one of said second plurality of nubs.

7. In an exhaust system including an exhaust manifold attached to an engine which is resiliently mounted to a vehicle frame and an exhaust outlet member which is rigidly mounted to the vehicle frame, a slip joint connection between said manifold and said outlet member, comprising:

an exhaust outlet sleeve rigidly mounted in flow communication with said manifold having a first peripherally outwardly extending portion and an internal cylindrical surface;

only one integral hollow piston, said piston having a second peripherally outwardly extending portion adjacent a downstream end thereof, the maximum diameter of said spherical surface being substantially equal to the internal cylindrical diameter of said sleeve, said upstream end of said piston being received in generally tight relation within said sleeve, said first end of said piston being in the form of a flat annular surface;

a conduit rigidly mounted in flow communication with said fluid exhaust member and having a flat annular inlet end adapted to abut radially and flatly in generally tight relation against said downstream end of said piston; and means for biasing said second peripherally extending portion away from said first peripherally extending portion sufficiently to forcibly abut said downstream end of said piston against said inlet end of said conduit.

* * * * *